(12) United States Patent
Minehan

(10) Patent No.: US 11,734,004 B2
(45) Date of Patent: Aug. 22, 2023

(54) COMPUTING SYSTEM AND METHOD

(71) Applicant: CORE SCIENTIFIC, INC., Bellevue, WA (US)

(72) Inventor: Kristy-Leigh Anne Minehan, Bellevue, WA (US)

(73) Assignee: CORE SCIENTIFIC OPERATING COMPANY, Bellevue, WA (US)

(*) Notice: Subject to any disclaimer, the term of this patent is extended or adjusted under 35 U.S.C. 154(b) by 739 days.

(21) Appl. No.: 16/777,503

(22) Filed: Jan. 30, 2020

(65) Prior Publication Data
US 2021/0240474 A1 Aug. 5, 2021

(51) Int. Cl.
| | |
|---|---|
| G06F 9/30 | (2018.01) |
| G06F 1/3206 | (2019.01) |
| G06F 9/38 | (2018.01) |
| G06Q 20/36 | (2012.01) |
| H04L 9/06 | (2006.01) |
| G06Q 20/38 | (2012.01) |
| H04L 9/00 | (2022.01) |

(52) U.S. Cl.
CPC ........ *G06F 9/30083* (2013.01); *G06F 1/3206* (2013.01); *G06F 9/3877* (2013.01); *G06Q 20/367* (2013.01); *G06Q 20/389* (2013.01); *H04L 9/0643* (2013.01); *H04L 9/50* (2022.05)

(58) Field of Classification Search
CPC .. G06F 9/30083; G06F 9/3877; G06F 1/3206; H04L 9/0643; H04L 9/50; G06Q 20/367; G06Q 20/389
See application file for complete search history.

(56) References Cited

U.S. PATENT DOCUMENTS

| | | | |
|---|---|---|---|
| 2019/0392468 A1* | 12/2019 | Stanciu | G06F 11/3433 |
| 2020/0143338 A1* | 5/2020 | Lucidarme | G06Q 20/065 |
| 2020/0342479 A1* | 10/2020 | Buck | G06Q 30/0212 |

(Continued)

OTHER PUBLICATIONS

Livingston et al., Applying Blockchain Technology to Electric Power Systems, Council on Foreign Relations, Jul. 2018, http://www.jstor.com/stable/resrep21340.

(Continued)

*Primary Examiner* — Azizul Choudhury
(74) *Attorney, Agent, or Firm* — Fishman Stewart PLLC

(57) ABSTRACT

A datacenter including a first voltage sensor and/or first amperage sensor along with a second voltage sensor and/or second amperage sensor. The first amperage and voltage sensors are associated with a first computing device (FCD) and the second amperage and voltage sensors are associated with a second computing device (SCD). The datacenter also includes an electronic control unit (ECU) that communicates with the FCD and the SCD. The ECU is configured to receive FCD energy consumption information and additional updated FCD energy consumption information via the first voltage and/or amperage sensor(s). FCD energy consumption information is associated with energy consumed by the FCD during a first customer billing cycle. The ECU is also configured to divide a first blockchain mining reward into a first customer portion and a first datacenter portion and withhold the first customer portion when the first datacenter portion is less than a first minimum threshold.

18 Claims, 9 Drawing Sheets

(56) References Cited

U.S. PATENT DOCUMENTS

2021/0314143 A1* 10/2021 Conner ................ H04L 63/067

OTHER PUBLICATIONS

Blockchain for Power Utilites: A View on Capabilites and Adoption, Cognizant, Mar. 2018.
How Does Your Data Center Break Down Pricing?, Aligned, Nov. 22, 2016, www.alignedenergy.com/post/how-does-your-data-center-break-down-pricing/.

* cited by examiner

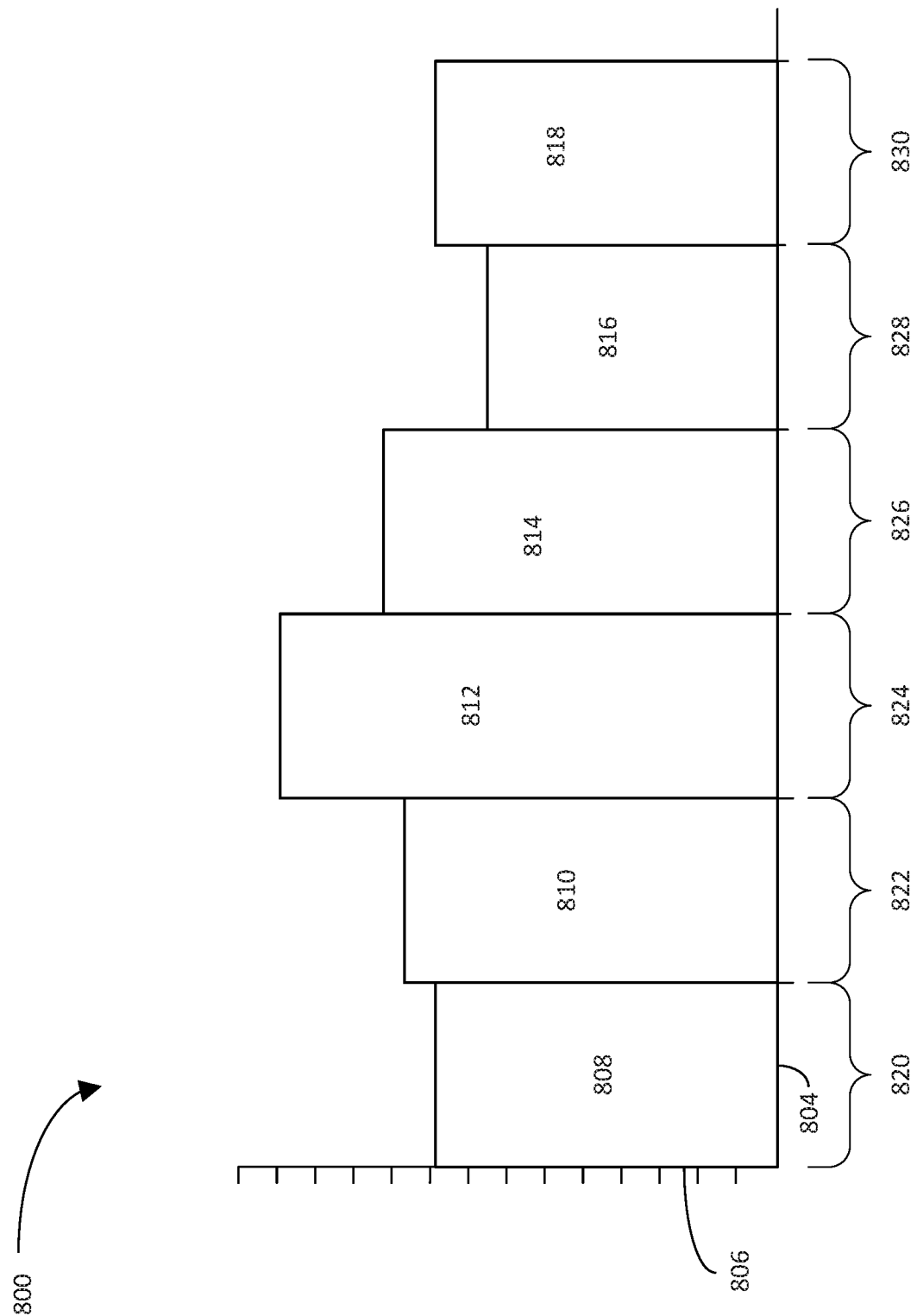

COMPUTING SYSTEM AND METHOD

FIELD OF TECHNOLOGY

The present disclosure generally relates to computing systems, including computing systems that may include a plurality of computing devices that may be used to carry out computing tasks/operations, such as in connection with smart contracts.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Datacenters such as cryptocurrency colocation or hosting centers provide an environment to house computing systems employed to mine one or more varieties of cryptocurrencies. Further, these datacenters generally provide a management system along with an infrastructure that enables these computing systems to mine cryptocurrency. These computing systems are often owned, leased, rented or the like by customers. For compensation or consideration for providing the management system and cryptomining infrastructure to these customers, the datacenter often charges a fee (e.g., a power or energy consumption fee) to the customer.

The customer fee(s) may be dependent, in part, on the energy consumed by the customer's computing system or device over a set timeframe (e.g., billing cycle). To determine energy consumption, techniques may be employed to estimate the total energy consumption of a customer's computing system or device over the set timeframe. Such techniques, however, may over-estimate or under-estimate the total energy consumption.

As such, there is a need for a system that determines energy consumption information associated with each customer's computing system in an accurate manner.

BRIEF DESCRIPTION OF THE DRAWINGS

FIG. 8A illustrates an exemplary graphical representation of energy consumption information.

DETAILED DESCRIPTION

Reference will now be made in detail to exemplary embodiments of the present disclosure, examples of which are described herein and illustrated in the accompanying drawings. While the present disclosure will be described in conjunction with exemplary embodiments and/or examples, it will be understood that they do not limit the present disclosure to these embodiments and/or examples. On the contrary, the present disclosure covers exemplary alternatives, modifications, and equivalents.

Computing systems discussed herein may be configured to implement, among other things, blockchain technology to benefit one or more parties. Through the use of blockchain technology, transactions (monetary or otherwise) can be recorded in a secure, efficient, and/or verifiable manner.

Computing systems may include one or more computing devices (hardware) having one or more configurations. Computing devices may, for example, include one or more processing units, such as electronic processors and/or microprocessors (e.g., a programmable microprocessor). A non-limiting list of exemplary processing units that may be employed by the computing systems follows: a central processing unit (CPU), an application specific integrated circuit (ASIC), a graphics processing unit (GPU), and/or a field programmable gate array (FPGA). One or more input/output (I/O) interfaces may be employed, such as to enable the input and output of information into and out of a processing unit or other device. A computing device, in some examples, may be configured as and/or referred to as a miner or cryptocurrency miner.

Non-transitory computer-readable storage medium(s) (e.g., memory) may be employed by the computing systems and/or devices to, for example, keep a record of the state of various aspects of the computing system and/or device. Further, a display such as a touch screen may be utilized by one or more of the computing systems and/or devices to interface with a user.

To manage and/or direct the flow of information between components of the computing systems/devices, controllers and/or microcontrollers may be employed. Controllers may take the form of hardware and/or software.

With appropriate programming instructions and/or code embodied in software, hardware, and/or other medium, the computing devices of a computing system may be caused to perform various functions, including those described in greater detail herein.

Figure 1:
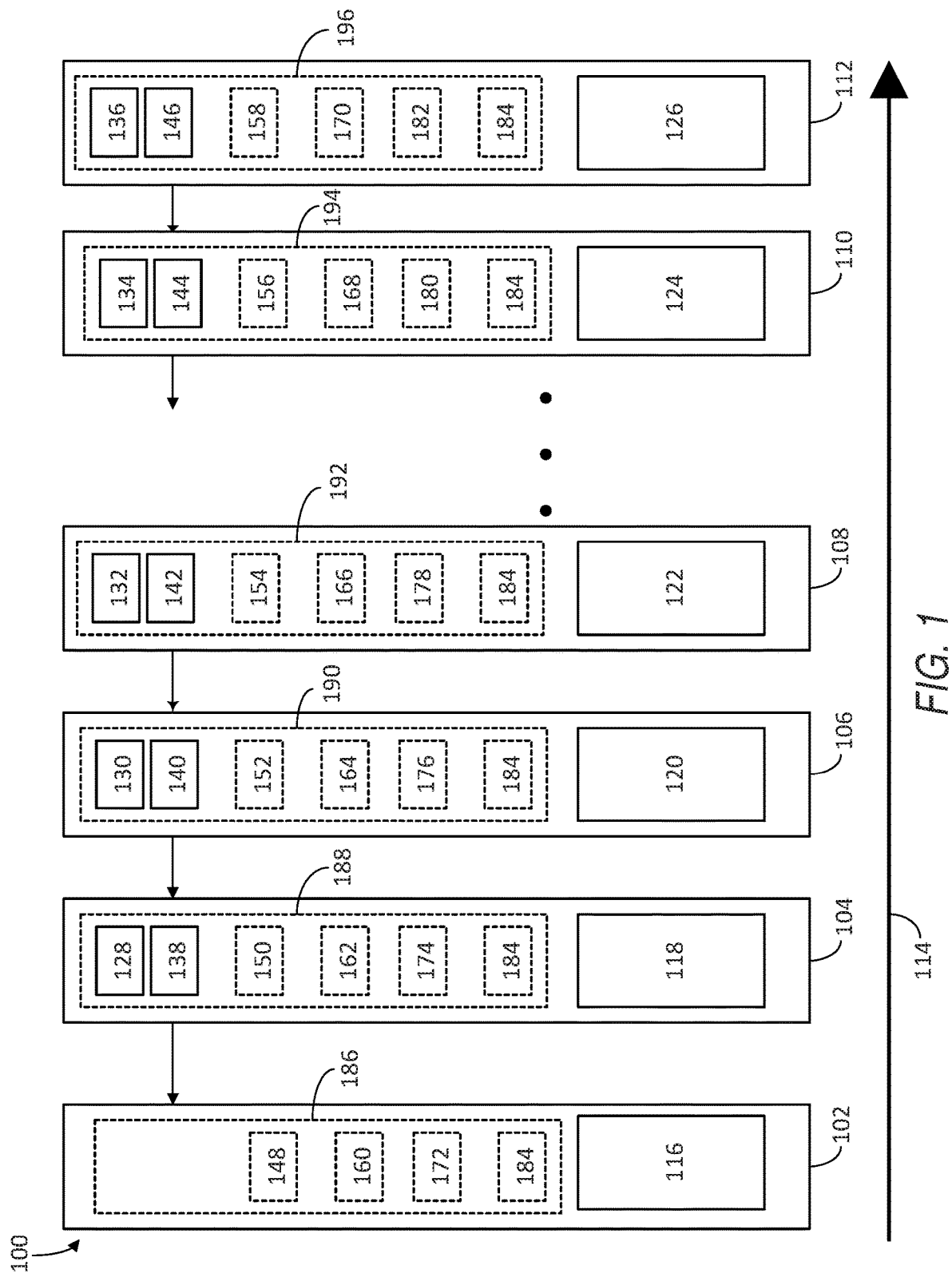
FIG. 1 represents an exemplary blockchain data structure.

FIG. 1 represents an exemplary blockchain 100 data structure that may be stored on one or more computing systems. The exemplary blockchain 100 includes a first block 102, a second block 104, a third block 106, a fourth block 108, up to an N-1 block 110, and an N block 112. A representative time each block 102-112 was created may be determined by its placement relative to a representative timeline 114.

Each block 102-112 may be a data structure container that, in part, may include a representation of aggregated transactions in the blockchain. A transaction may, for example include the transfer of value (monetary, hardware, personal property, or otherwise) from one address to another. Each transaction may change the state of data on the blockchain 100. A first set of aggregated transactions 116 is represented in the first block 102. A second set of aggregated transactions 118, added after the first block 102 was added to the blockchain 100, is represented in the second block 104. A third set of aggregated transactions 120, added to the blockchain 100 after the first and second blocks 102, 104 were added, is represented in the third block 106. Additional aggregated transactions 122-126 are respectively represented in the fourth, (N-1), and N blocks 108-112, respectively. While aggregated transactions 116-126 generally represent the aggregation of multiple transactions, one or more of the aggregated transactions 116-126 could instead represent only one transaction. For example, the aggregated transactions 116 represented in the first block 102 may represent only one transaction.

Each block 104-112, except for the first block 102, includes a cryptographic hash 128-136 representing information from the previous block 102-110, respectively. Each cryptographic hash 128-136 may be created by a cryptographic one-way hash function, which will be described below with respect to FIG. 3. A cryptographic hash (hereinafter referred to as a hash) may include a fixed-length character string that uniquely represents data (information). As mentioned above, each hash 128-136 in the blockchain 100 uniquely represents information from the previous block 102-110, respectively. For example, the hash 132 in the fourth block 108 uniquely represents information from the third block 106, the hash 130 in the third block 106 uniquely represents information from the second block 104, and the hash 128 in the second block 104 uniquely represents information from the first block 102. Accordingly, each block added to the blockchain 100, for example the N−1 or the N block 110, 112 respectively, includes the hash 134, 136 of the previous block. If there are no blocks prior to the first block 102, as shown in the blockchain 100 of FIG. 1, the first block 102 will not have a hash representing a previous block.

The information each hash 128-136 uniquely represents includes, at least, the aggregated transaction data 116-124 of the previous block. For example, the hash 132 in the fourth block 108 uniquely represents at least the aggregated transaction data 120 represented in the third block 106, the hash 130 in the third block 106 uniquely represents at least the aggregated transaction data 118 represented in the second block 104, and so on.

The blockchain 100 also includes a plurality of pointers 138-146. That is, the second through N blocks 104-112 include a respective pointer 138-146. Each pointer 138-146 represents an address to the previous block. For example, the pointer 138 of the second block 104 represents an address of the first block 102, the pointer 140 of the third block 106 represents an address of the second block 104, the pointer 142 of the fourth block 108 represents an address of the third block 106, and so on.

Through the implementation of the pointers 138-146 and hashes 128-136, each block 102-112 is effectively chained together.

The blockchain 100 is intended to be an append-only data structure that only allows data to be read therefrom and new data added thereto; the blockchain 100 includes safeguards to restrict and/or prevent hacking or unintentional changes thereto. The hashes 128-136 stored in the second through N−1 blocks 104-112 may provide one of these safeguards. For example, if transaction information in an existing block of the blockchain 100 were changed, its hash would also change. Accordingly, the hash of any subsequent block would not match the hash of the previous block. For example, take the blockchain 100 of FIG. 1. If any portion of the aggregated transaction data 118 represented in the second block 104 were maliciously or unintentionally changed, the hash of the modified second block 104 would not match the hash 130 stored in the third block 106. As such, since the hash of the modified second block 104 would not match the hash 130 in the third block 106, it would be apparent to those monitoring the system that the second block 104 has been modified.

The blockchain 100 may also include metadata summarizing various aspects of each block and/or one or more preceding blocks. For example, each block may include a timestamp 148-158 representing the time the respective block was created and/or validated, a block height 160-170 representing the block sequence in the blockchain 100, a Merkle Root 172-182 representing a hash of the aggregated transaction data within the block, and/or a version number 184 representing the software/protocol version governing the creation of the blockchain 100. As will be described below with respect to FIG. 5, the Merkle Roots 172-182 of FIG. 1 each uniquely represent aggregated transaction data within each respective block 102-112. For example, the Merkle Root 178 of the fourth block 108 may include a hash of the aggregated transaction data 122 of the same block 108. While Merkle Roots 172-178 are shown, other unique representations of the respective aggregation data may instead be employed. Further, other metadata may also be included in blocks 102-112 of the blockchain 100.

Metadata, such as the metadata 148-184 described above, along with pointers 138-146 and/or previous block hashes 128-136 may be stored in a block header 186-196 of each respective block 102-112. As such, various block properties may be efficiently searched via a search of the block headers 186-196 of each respective block 102-112.

Figure 2:
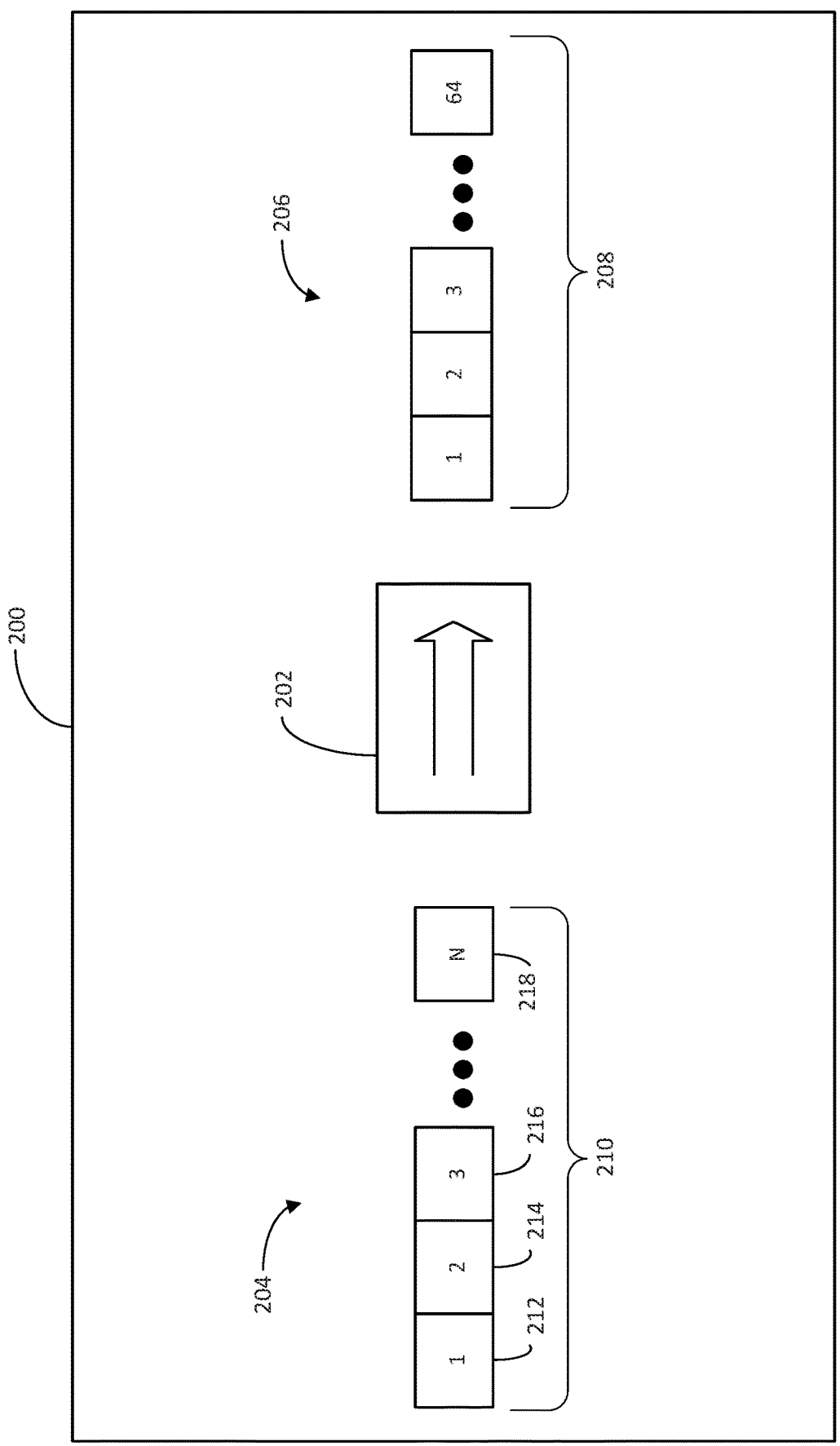
FIG. 2 illustrates an exemplary computing device/system carrying out an exemplary one-way cryptographic hash function.

With reference now to FIG. 2, an exemplary computing device/system 200 carrying out an exemplary one-way cryptographic hash function 202 is illustrated. The exemplary one-way hash function 202 receives an input 204 of an arbitrary size and outputs 206 a character string 208 of a fixed size. The character string 208 may, for example, be referred to as a hash value, a hash, and/or a digest. The exemplary hash function 202 is configured such that any change to the input 204 creates an effectively random change to the output 206. As such, it is infeasible to determine the original input 204 from the output 206 without further information. Further, due to the nature of the exemplary hash function 202, it is infeasible to guess an input that will produce a predetermined output.

The input 204 may, for example, represent a transaction (monetary or otherwise). Further, each input 204 may be a character string 210 of different or equal lengths. Each character 212-218 of the character string 210 may, for example, be an integer or a letter.

The output character string 208 of the hash function 202 may, for example, be a fixed-length of sixty-four characters long, where each character may be a number (0-9) or a letter (a-f) (e.g., may be in a hexadecimal format). This output character string 208 may be represented as a two hundred fifty-six-bit string in machine language. As mentioned above, the exemplary hash function 202 fixes the length of the output character string 208 to sixty-four characters, regardless of the character string length of the input character string 210. Other hash functions, however, may be configured to output fixed-length character and/or bit strings of a different fixed-length than that shown in FIG. 2.

A cryptographic hash function (e.g., the hash function 202 of FIG. 2) employed in a blockchain network may be known to users and computer systems/devices in a network. As such, when needed, each computer system/device may implement the same cryptographic hash function.

Referring now to FIGS. 1 and 2, an exemplary implementation of the cryptographic hash function 202 with the blockchain 100 is discussed. The cryptographic hash function 202 may be utilized to uniquely represent aggregated transaction data 116-126 of each block 102-112. For example, aggregated transaction data 118 represented in the second block 104 may be input 204 into the cryptographic hash function 202 to create the unique output hash 130 stored in the third block 106.

Additional data, however, may also be input into the cryptographic hash function 202 along with, or in addition to, the aggregated data 116-126. For example, the hash 130 in the third block 106 may represent a hash of the timestamp 150, block height 162, and/or Merkle Root 174 of the second block 104 in conjunction with the aggregated data 118 represented in the second block. The hash 130 in the third block 106 may, for example, even be a hash of the entire second block 104. Regardless of the input scheme employed for the hash function 202, each hash 128-136 may employ the same representative input(s). In other words, if the hash 130 in the third block 106 only uniquely represents the aggregated transaction data 118 of the previous block 104, then the hashes 128, 132-136 in the other blocks 104, 108-112 may only uniquely represent the aggregated transaction data of their preceding block. Similarly, if the hash 130 in the third block 106 instead uniquely represents the entire second block 104 (e.g., a hash of the entire second block 104), then the hashes in the other blocks may also uniquely represent the entirety of their preceding block. As such, though each hash input may vary, the type of hash input(s) employed may be consistent for each hash 128-136.

Figure 3:
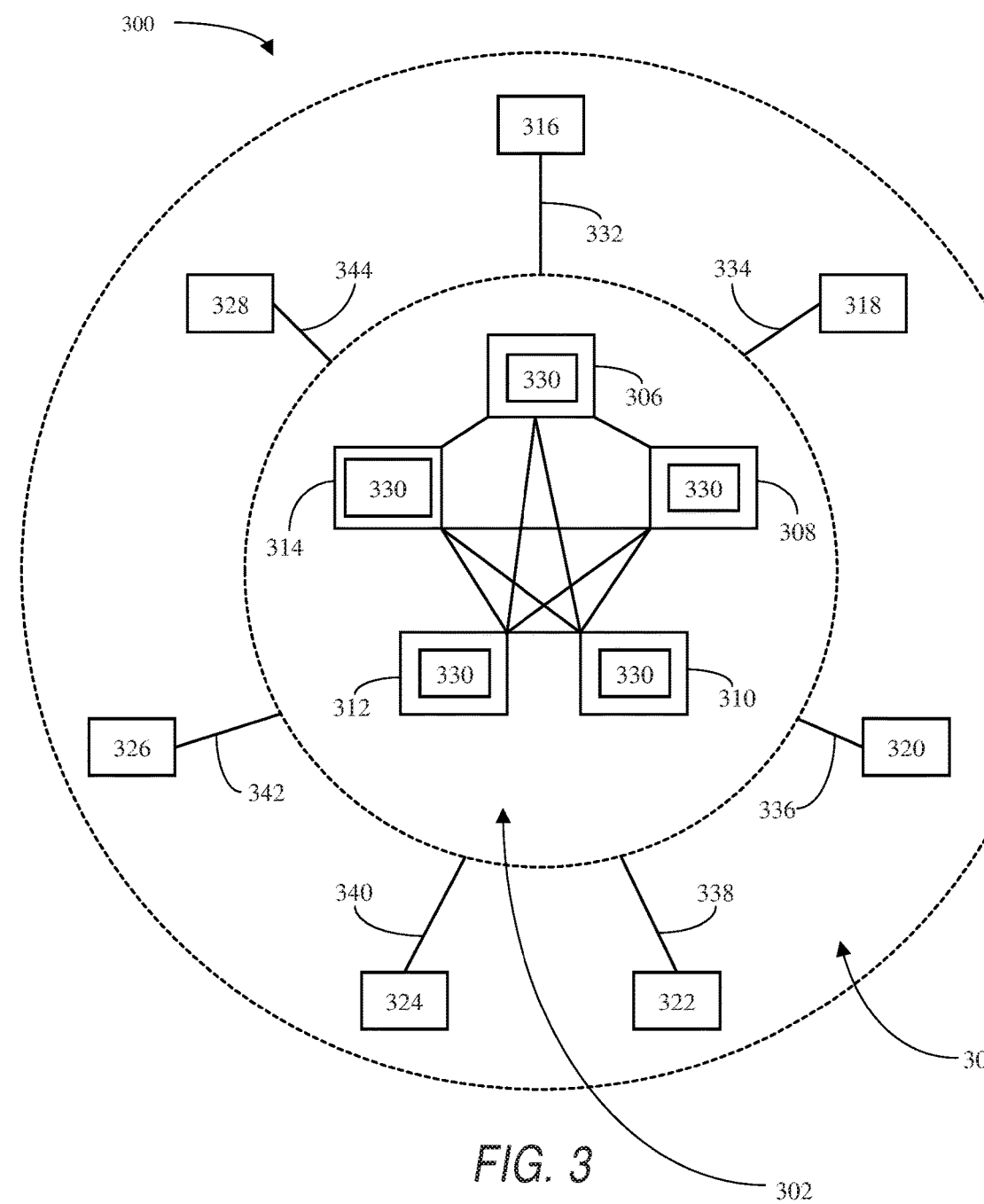
FIG. 3 represents an exemplary transaction network employing blockchain technology.

FIG. 3 represents an exemplary computing network 300 employing blockchain technology. Within the exemplary computing network 300, which may be public and/or private, is a validation network 302 and an ancillary network 304. The validation network 302 includes a plurality of validation computing systems 306-314 and the ancillary network 304 includes a plurality of ancillary computing systems 316-328. Other computing networks may employ differing numbers of ancillary and validation computing systems 306-328.

Each validation or ancillary computing system 306-314, 316-328 of FIG. 3 may or may not be at a unique location. Further, any single computing system (e.g., validation computing system 306 and/or ancillary computing system 316), may be comprised of components located at different geographic locations and/or at the same location.

The exemplary computing network 300 may be a permissioned or permissionless network. If the computing network 300 is permissionless (e.g., an open public network), the computing systems 306-328 may not utilize access permissions. On the other hand, if the computing network 300 is a permissioned network, the computing systems 306-328 may require some authority to grant access thereto so that they may access the computing network 300. There may also be instances the computing network 300 employs some type of hybrid access system, where one or more computing systems 306-328 require permission and other computing systems 306-328 do not require permission for access.

With continued reference to FIG. 3, each validation computing system 306-314 on the validation network 302 stores a copy of a blockchain 330, or at least a portion thereof, to securely and verifiably record transactions. As discussed above, a transaction may include the transfer of value from one address to another. The value may be monetary or otherwise. Each validated transaction changes the state of data on the blockchain 330. When one or more transactions are validated by the validation network 302, the blockchain 330 may be updated.

As opposed to some traditional data structures that permit information to be created, read, updated, and deleted from the data structure, the blockchain 330 is intended to only allow information to be read therefrom and added thereto. As such, the blockchain 330 may securely store validated transactions.

Unlike transaction data structures where a centralized entity controls the state of the data structure, the blockchain 330 is decentralized. For example, instead of being controlled by a centralized authority, the state of a blockchain 330 is controlled by a consensus mechanism implemented by a plurality of the validation computing systems 306-314 in the validation network 302. As such, the blockchain 330 is configured as a distributed data structure (e.g., a distributed ledger) controlled by a consensus mechanism. The consensus mechanism may include a set of rules and/or algorithms that are generally employed by a majority (if not all) of the validation computing systems 306-314. Within the consensus mechanism, there may be an incentive that rewards a computing system for adding valid and non-fraudulent transactions to the blockchain. The incentive may be monetary or otherwise.

One or more of the ancillary computing systems 316-328 can send a proposed transaction 332-344 to the validation network 302. The validation network 302 then attempts to verify each proposed transaction 332-344. Accordingly, one or more of the validation computing systems 306-314 verify and aggregate the proposed transactions 332-344 into a proposed block for the blockchain 330. Since more than one validation computing system 306-314 may create a proposed block, multiple proposed blocks may be created. Each proposed block may be created in accordance with the rules of the blockchain 330. For example, each proposed block may include a hash of aggregated transaction data from the previous block, a pointer to the previous block, and/or any other data the rules deem necessary (see, e.g., FIG. 2).

With continued reference to FIG. 3, after the proposed block(s) are created, the consensus mechanism attempts to validate one of the proposed blocks. When a proposed block is validated by the consensus mechanism carried out by the validation computing systems 306-314, the validated block (see, e.g., the Nth block 112 of FIG. 1) is added to the blockchain 330 of FIG. 3. In other words, if a particular state change of the blockchain 330 is proposed by one of the validation computing systems 306-314, such change may not be implemented (e.g., the blockchain 330 will not be appended) unless the consensus mechanism implemented by the validation network 302 allows for the state change. For example, if the third validation computing system 310 proposes a new block to be added to the blockchain 330, such proposed block may not be added unless the consensus mechanism implemented by the other validation computing systems 312-314 validates the proposed block. Additionally, if a block is added to the blockchain 330, but is later determined to be invalid, the block may remain in place, but the blockchain may split off from the prior block ("fork") with a new path including valid blocks (and not the invalid block).

One or more of a variety of consensus mechanisms may be employed to determine what block(s)/transaction(s) are to be appended to a blockchain (e.g., blockchain 330). For example, a Proof of Work (POW) mechanism, a Proof of Stake (POS) mechanism, a Delegated Proof of Stake (DPOS) mechanism, a Proof of Capacity (POC) mechanism, a Proof of Elapsed Time (POET) mechanism, a Practical Byzantine Fault Tolerance (PBFT) mechanism, and/or a Directed Acyclic Graph (DAG) mechanism are just a few types of consensus mechanisms that may be employed by networks to control the addition of valid blocks/transactions to a blockchain.

As shown in FIG. 3, and for clarity, the ancillary computing systems 316-328 may be distinct from the validation computing systems 306-314. However, in other exemplary computing networks, one or more validation computing systems may serve as an ancillary computing system and vice versa. For example, one or more validation computing systems may also submit transactions to a validation network and/or one or more ancillary computing systems may function as a validation computing system in the validation network.

Figure 4:
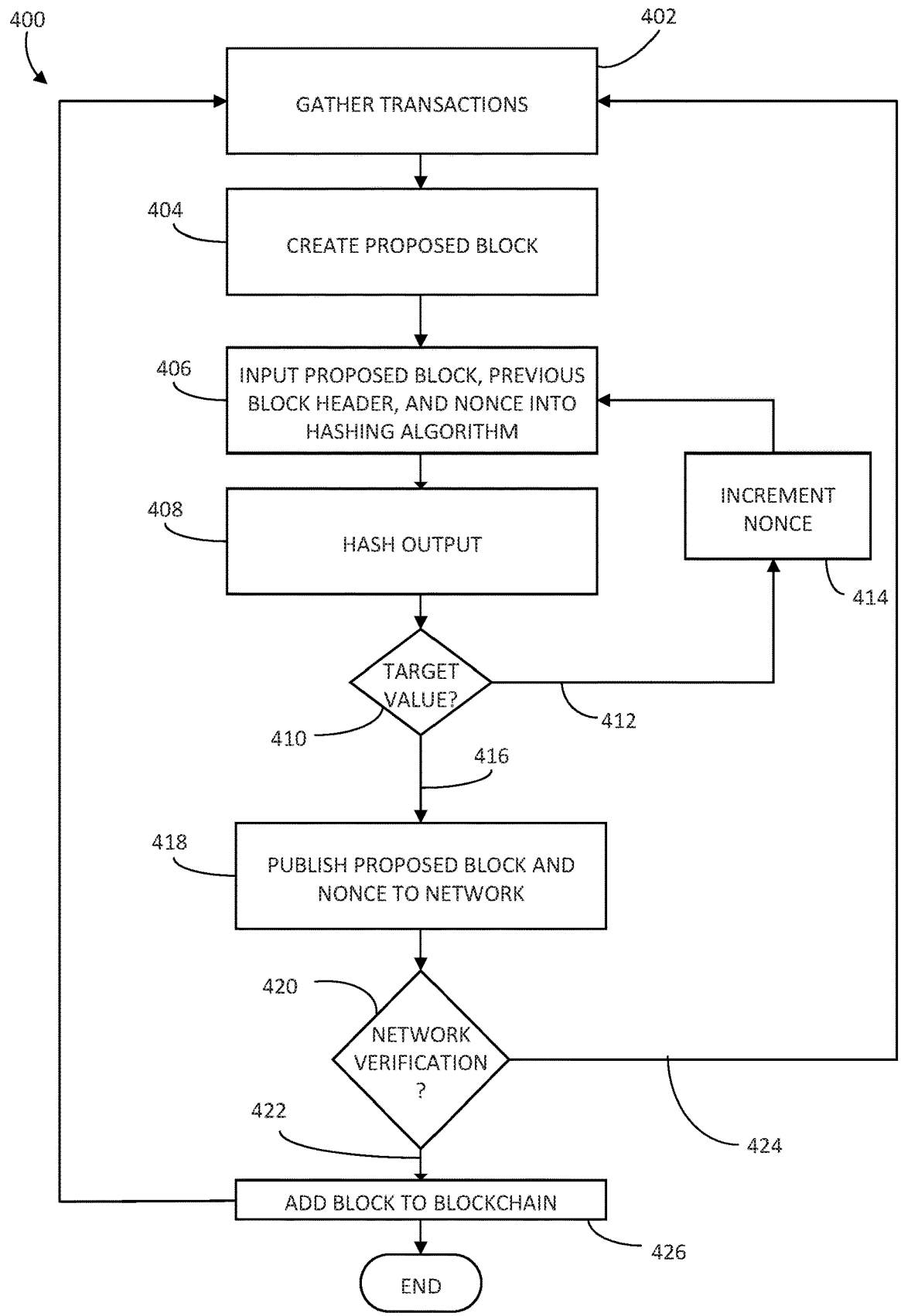
FIG. 4 is a flowchart setting forth an exemplary technique for adding a block to a blockchain.

With reference now to FIG. 4, an exemplary method or technique 400 for adding a block to a blockchain is illustrated. The exemplary technique 400 may be considered a proof of work consensus mechanism.

Exemplary technique 400 of FIG. 4 begins at section 402 where a computing system gathers one or more transactions and verifies those transactions. Using the gathered and verified transaction(s), a proposed block is created at section 404. Process control then proceeds to section 406, where the proposed block, the previous block header (e.g., one of the block headers 186-196 of FIG. 1), and a current nonce value are input into a cryptographic hashing algorithm to output a hash representing the combined inputs at section 408. In other words, the cryptographic hash function may, for example, receive three inputs: the proposed block information, the previous block header, and the current nonce value. In other examples, additional or alternative block inputs may be employed.

With continued reference to FIG. 4, the nonce (or nonce value) may, for example, be a 32-bit field. This field, as will be discussed below, may be incremented by a computing system in an attempt to output a hash that meets or falls within a known target value (e.g., a target hash value). Further details regarding the target value and nonce value will also be set forth below.

At section 410, process control determines if the hash of section 408 meets or falls within an already known target value. As discussed above, the target value may be predetermined or known. The target value may, for example, be a 256-bit number. In some circumstances, the first series of bits in the target value may be zeros. For example, the first five bits in a 256-bit target value may be zero. A hash value will meet or fall within the target value if at least the first five bits of the hash value are also zero. If, on the other hand, the 256-bit target value begins with ten zeros, then a hash value will not meet the target value unless the hash value begins with at least ten zeros.

If the hash does not meet the target value 412, process control proceeds to section 414 where the current nonce value is incremented (e.g., changed by an integer value). The proposed block, the previous block header, and the current nonce value (i.e., the incremented nonce value of section 414) is input into the cryptographic hash function at section 406 to create a new hash value at section 408. While the current nonce value has changed 414, the proposed block and the previous block header has not changed. This process of incrementing the nonce value 414 and rehashing 408 repeats until it is determined at section 410 that the hash meets the target value 416. When it is determined that the hash value meets the target value 416, process control proceeds to section 418 where the new (proposed) block and the nonce value employed to meet the target value is published to a network. Attempting to identify or create valid blocks, which may include computations to identify a target hash value, such as to receive a reward, may be referred to as mining (or cryptocurrency mining if the blockchain and/or the reward is associated with a cryptocurrency).

At section 420, the network (e.g., the validation network 302 of FIG. 3) verifies that the published block and the nonce value does indeed produce a hash that meets the known target value. In other words, the network either verifies 422 the proposed block, or does not verify 424 the proposed block.

To verify, the network may gather inputs such as the previous block header from the blockchain, the proposed block with the aggregated transactions, and the proposed nonce value. The inputs, which include the proposed nonce value, may then be hashed one or more times to verify that the hash meets the known target value. If the proposed block is verified 422, it is added to the blockchain at section 426. When the block is verified and added to the blockchain, a reward may be addressed to the computing system(s) that created the verified block.

If there is no verification that the previous block header along with the proposed block and nonce value produce a hash that meets the known target value, process control proceeds back to section 402 and a reward is not allocated/addressed.

After the block is added to the blockchain at section 426, process control may proceed to an end or back to section 402, where additional transactions are gathered.

Technique 400 may be carried out simultaneously by many computing systems. In such a case, the first computing system to propose a block that is verified by the network receives the reward. Further, while these computing systems may represent distinct computing devices, one or more of the computing systems may represent or be part of a pool of computing devices. For example, a computing system may include of a plurality of computing devices (e.g., GPUs). In such a system, each computing device may be attempting to find the proper nonce value and create a verified block. Once one of the computing devices of the system finds the proper nonce value and creates a verified block, the reward may be divided up between each computing device (e.g., each computing device of the pool) working on the block. The reward may be divided up in a number of different ways. For example, the reward may be divided equally among all computing devices of the pool working to create the verified block. Alternatively, the reward may be proportioned to benefit those devices that put in the most work (e.g., carried out the most nonce incrementations). For example, the more distinct nonce incrementations a computing device/system carries out during hashing operations, the larger the percentage of the reward the computing device/system may receive.

The target value discussed above may be manipulated to adjust the average time between block creation (verification). This is because the target value may determine the average nonce incrementations needed for the hash to meet the target value. For example, the average amount nonce incrementations needed to meet a 256-bit target value beginning with five zeros can be estimated. This estimated number of nonce incrementations is generally less than an estimated amount of nonce incrementations needed to reach a target value beginning with ten zeros, which in turn is generally less than an estimated amount of nonce incrementations needed to meet a 256-bit target value beginning with fifteen zeros. As such, by adjusting the target value (e.g., by increasing or decreasing the leading zeros of the target value), the average number of nonce incrementations needed to reach or meet the target value can also be manipulated. Since nonce incrementations are generally proportionally related to time, the more nonce incrementations needed to meet a target value, the more time is involved to create a verified block. And conversely, the fewer nonce incrementations needed to meet a target value, the less time being generally involved to create a verified block.

Accordingly, adjustment of the target value may manipulate the average time involved to create a new block in a blockchain. By increasing the number of leading zeros in a 256-bit target value, for example, the average nonce incrementations involved to find a hash that meets the target value is increased, and in turn the average amount of time involved to find a hash that meets the target value also increases.

A blockchain (e.g., the blockchain 100 of FIG. 1 and/or the blockchain 330 of FIG. 3) may be configured as robust systems that may be capable of securely storing verifiable information. As transactions may continually be added to the blockchain, the blockchain can become a large data structure relatively quickly. To efficiently store transactional data/information efficiently, Merkle Tree techniques may, for example, be employed. As will be discussed below, Merkle Trees techniques may efficiently store data while also enabling efficient verification of information within the data set.

Figure 5:
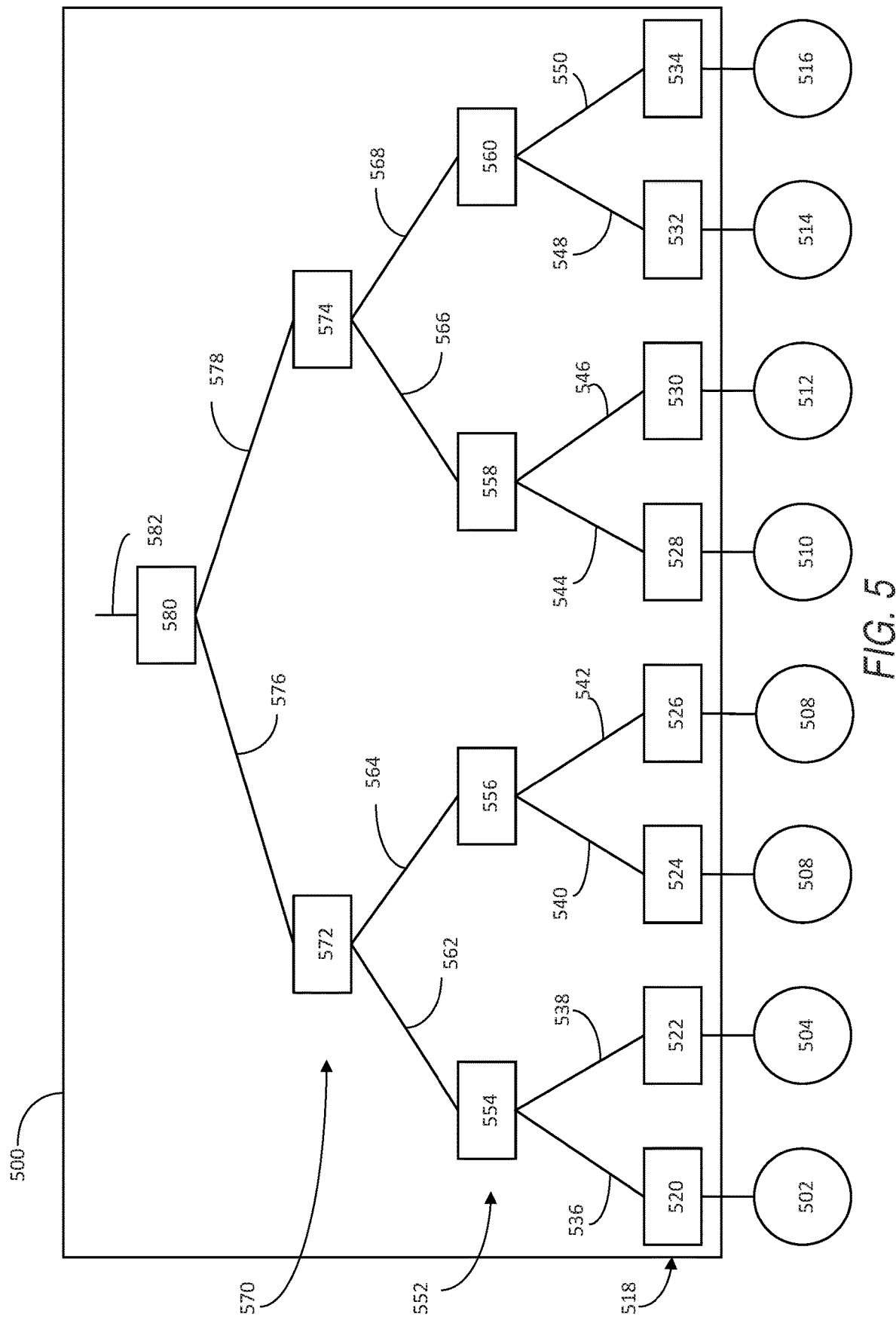
FIG. 5 represents an exemplary Merkle Tree receiving a plurality of transaction inputs.

FIG. 5 represents an exemplary Merkle Tree 500 in visual form. While the Merkle Tree 500 is represented visually for clarity, the Merkle Tree 500 is intended to take the form of instructions that a computing device or system may carry out.

As illustrated, the Merkle Tree 500 is shown receiving a plurality of transaction inputs 502-516. Each transaction input 502-516 represents a transaction to be aggregated into a block (e.g., the Nth block 112 of FIG. 1).

The exemplary Merkle Tree 500 of FIG. 5 includes a first tier 518 of cryptographic hashing nodes 520-534 that produce a plurality of first-tier hash outputs 536-550, a second tier 552 of cryptographic hashing nodes 554-560 that produce a plurality of second-tier hash outputs 562-568, a third tier 570 of cryptographic hashing nodes 572-574 that produce a plurality third-tier hash outputs 576-578, and a Merkle Root node 580 that may produce a Merkle Root Hash 582

The first tier 518 of hashing nodes 520-534 may hash the respective transaction inputs 502-516 to provide respective first-tier hash outputs 536-550. For example, the first hash node 520 of the first tier 518 may hash the first transaction input 502 to its hash output 536, the second hash node 522 of the first tier 518 may hash the second transaction input 504 to its hash output 538, the third hash node 524 of the first tier 518 may hash the third transaction input 506 to its hash output 540, and so on.

A second tier 552 of hashing nodes 554-560 may then hash concatenated hashes fed into each hashing node 554-560 to respective second-tier hash outputs 562-568. Concatenation may include the serial linking of two hashes in particular order. For example, the first hashing node 554 of the second tier 552 concatenates (string together in a predetermined order) the first transaction hash 536 with the second transaction hash 538, and then hashes that concatenation of hashes to create the respective second-tier hash 562. In a similar manner, the second hashing node 556 of the second tier 552 concatenates the third transaction hash 540 with the fourth transaction hash 542, and then hashes that concatenation of hashes to create its respective second-tier hash 564. The remaining second-tier hashes 566, 568 may be produced in a similar manner via the remaining second-tier hashing nodes 558, 560.

The third tier 570 of hashing nodes 572, 574 then hash concatenated hashes provided into each hashing node 572, 574. For example, the first hashing node 572 of the third tier 570 concatenates the first hash output 562 from the second tier 552 with the second hash output 564 from the second tier 552, and then hashes that concatenation of hashes to create its respective third-tier hash 576. Similarly, the second hashing node 574 of the third tier 570 concatenates the third hash output 566 from the second tier 552 with the fourth hash output 568 from the second tier 552, and then hashes that concatenation of hashes to create its respective third-tier hash 578.

At the top of the exemplary Merkle Tree 500 is the Merkle Root node 580. The Merkle Root node 580 concatenates the first third-tier hash 576 with the second third-tier hash 578, and hashes that concatenation of hashes to produce a Merkle Root hash output 582 (which may be referred to as the Merkle Root). Accordingly, the Merkle Root 582 represents a hash of all the transaction inputs 502-516 in a single value.

While there are only eight transactions 502-516 input into the Merkle Tree 500 of FIG. 5, other Merkle Trees may be formed from fewer or greater transactions/inputs in a similar manner using Merkle Tree techniques.

Since a cryptographic hash function (e.g., the cryptographic hash function 202 of FIG. 2) employed by each hashing node 520-534, 554-560, 572-574, 580 of FIG. 5 may output a fixed-length character or bit string 536-550, 562-568, 576-578, 582, the Merkle Root 582 may efficiently represent all of the transaction inputs 502-516. That is, the fixed-length character string of the Merkle Root 582 can be much less than the sum of character strings input 502-516 into the Merkle Tree 500.

While FIG. 5 illustrates that a Merkle Tree can be employed to efficiently represent data, other types of Merkle Trees or other data structures (e.g., Patricia Trees) may instead (or also) be employed to efficiently store data or a representation thereof in a block of a blockchain.

Reference is now made to FIGS. 1-3, and 5 to describe an exemplary interaction of a Merkle Tree 500 with a blockchain (e.g., blockchain 100). To serve as an illustration, the exemplary Merkle Tree 500 of FIG. 5 may represent the transaction data 120 of the third block 106 of FIG. 1. As such, the Merkle Root 176 of FIG. 1 may be the Merkle Root 582 of FIG. 5. Storing aggregated transaction data in this manner may reduce and/or minimize the space needed to store such data.

In addition to efficiently representing transaction data, the Merkle Tree 500 may be employed to efficiently search for a particular transaction. That is, the Merkle Tree 500 may allow a computing system to efficiently determine if a particular transaction (e.g., one of transaction inputs 502-516) is part of a data set or block 102-112 of the blockchain 100.

For example, if the first ancillary computing system 316 of FIG. 3 is responsible for the fifth transaction 510 of FIG. 5, the ancillary computing system 316 may determine if the transaction 510 is part of the blockchain 100 and in what block 102-112 it is stored. To accomplish this task, the ancillary computing system 316 may utilize the transaction information (the fifth transaction input 510) and the cryptographic hash function 202 of FIG. 2. With this information, the ancillary computing system 316 can input the transaction 510 into the cryptographic hash function to calculate its hash, which may be equivalent to the hash output 544 from the fifth hashing node 528 of the first tier 518. This hash can be submitted to the validation network 302 associated with the blockchain 100. Rather than conveying the entire Merkle Tree to the ancillary computing system 316, the validation network 302 need only convey the hash output 546 of the sixth hashing node 530 of the first tier 518, the hash output 568 of the fourth hashing node of the second tier 552, and the hash output 576 of the first hashing node 572 of the third tier 570 to the ancillary computing system 316. The ancillary computing system 316 can then determine if the fifth transaction 510 is part of a stored Merkle Tree as follows: a) concatenate the computed transaction hash output 544 with the first-tier hash output 546 received from the network and hash the concatenation to compute the second-tier calculated output hash 566; b) concatenate the computed output hash 566 with the second-tier hash output 568 received from the network and hash the concatenation to compute the third-tier hash 578; and c) concatenate the computed output hash 578 with the third-tier hash 576 received from the network and hash the concatenation to compute the Merkle Root 582. As such, the ancillary computer 316 has determined the Merkle Root 582 via the first-tier output hash 546, the second-tier output hash 568, and the third-tier output hash 576 received from the network.

The ancillary computing system 316 can then query the network to determine if the calculated Merkle Root 582 is stored in the blockchain 100. If the Merkle Root 582 is stored in the blockchain 100 then the transaction 510 is also represented in the blockchain 100. If the Merkle Root 582 is not stored in the blockchain 100, then the transaction 510 is not represented in the blockchain 100. According to the example set forth above, the Merkle Root 582 is equivalent to the Merkle Root 176 (in the third block 106) of FIG. 1. As such, the Merkle Root 582 is part of the blockchain 100, and therefore the transaction 510 is part of the blockchain 100.

As set forth in the example above, a computing system may utilize a small subset of data (e.g., hashes 546, 568, 576) from the Merkle Tree to verify if a transaction has been validated in a blockchain 100, 330, which may improve computing efficiency and/or reduce power consumption. It is noted that the ancillary computing system 316 may not need to send the transaction input 510 to the network to determine if the transaction was part of the blockchain 100. Rather, the ancillary computing system 316 may merely send the hash 544 of the transaction to the network. In response, the computing network may provide a small subset of data (e.g., hashes 546, 568, 576) that may allow the ancillary computing system 316 to determine if the transaction 510 was part of the blockchain. Using a similar technique, in can be efficiently determined if other transactions (e.g., transactions 502-508, 512-516) are part of the blockchain 100 via a small subset of data and access to the cryptographic hashing function.

Figure 6:
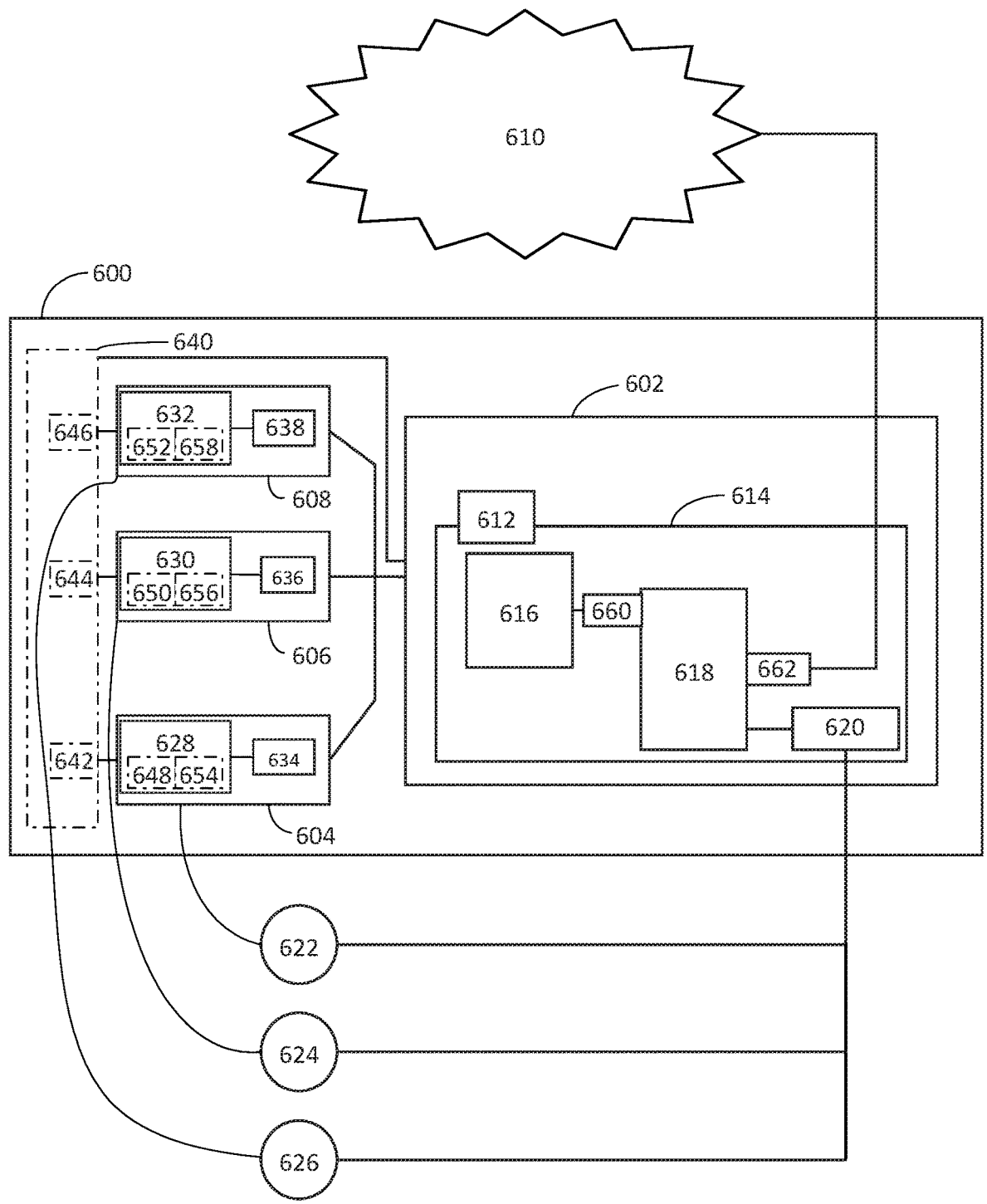
FIG. 6 illustrates a representation of an exemplary interaction between a datacenter and customer computing systems.

With reference now to FIG. 6, a representation of an exemplary interaction between a datacenter and customer computing systems is set forth. The representation includes a datacenter 600, a datacenter computing system such as an electronic control unit 602, a first computing system 604, a second computing system 606, and a third computing system 608. As will be described in further detail below, the first, second, and third computing systems 604-608 may be considered customer computing systems. The datacenter is configured to communicate with a distributed network 610.

The ECU 602 of the datacenter 600 includes a processor unit 612 (e.g., one or more processors) and one or more non-transitory computer readable storage medium(s) 614 (e.g., memory) storing instructions thereon. Included on the computer readable storage medium 614 is an oracle 616, a smart contract 618, and an invoicing system 620. The oracle 616, the smart contract 618, and the invoicing system 620 each respectively include a set of instructions. While the ECU 602 is represented as occupying a distinct location, other examples, may have components of the ECU 602 at various locations. For example, the computer readable storage medium(s) 614 need not be at the same general location as the processing unit 612. Further, the oracle 616, smart contract 618, and/or the invoicing system 620 also need not be at the same location. For example, the smart contract 618 may be associated with an off-site blockchain.

With reference back to FIG. 6, the processing unit 612 carries out the respective instructions related to the oracle 616, the smart contract 618, and the invoicing system 620. As such, when executing the respective instructions, the processing unit 612 interacts with, for example, the oracle 616, the smart contract 618, and/or the invoicing system 620.

The smart contract 618 may be code (e.g., bytecode) stored on a blockchain (e.g., blockchain 100 of FIG. 1 or blockchain 330 of FIG. 3) and/or configured to operate in tandem with a blockchain instead of being stored thereon. In one example, smart contract 618 may be written for the Ethereum blockchain in Solidity, which is an object-oriented, high-level language for implementing smart contracts. Other examples using different languages and/or blockchain networks, however, may also be employed. The smart contract 618 may be self-executing and/or immutable. Further details regarding the smart contract 618 will be set forth below.

The oracle 616 may, for example, be code and/or a combination of code and hardware. The oracle 616 is configured to provide information to the smart contract 618. Alternatively, if the smart contract 618 is integrated into a blockchain, the oracle 616 may provide the blockchain the information so that the smart contract 618 may operate on the information provided. In other words, the oracle 616 may be configured to supply "off-chain" information to the blockchain, thus making the information "on-chain" information.

Since the oracle 616 feeds information to the smart contract 618, which may be stored on a blockchain, the oracle 616 and the smart contract 618 may be configured to operate over a plurality of computing systems of a distributed network 610 (see also, e.g., the network 304 of FIG. 3) in addition to operating on the ECU 602. While the ECU 602 may be owned and operated by the datacenter 602, other computing systems of the distributed network 610 need not be owned by the datacenter 602.

The customer computing systems 604-608 housed in the datacenter 600 are respectively associated with a plurality of customers 622-626 of the datacenter 600. Though not shown, a customer may be associated with more than one computing system.

With continued reference to FIG. 6, each customer computing system 604-608 includes at least one computing device 628-632 (e.g., a GPU, CPU, ASIC, FPGA, or other processing unit). That is, the first computing system 604 includes a first computing device 628, the second computing system 606 includes a second computing device 630, and the third computing system 608 includes a third computing device 632.

The datacenter 600 provides energy (electricity) to the customer computing systems 604-608, which may be configured to carry out cryptocurrency mining operations. The datacenter 600 may also provide other infrastructure and/or management services for the customer computing systems 604-608. For example, in addition to providing electricity, the datacenter 600 may provide cooling for the customer computing systems 604-608. In consideration for the infrastructure and/or service(s) the datacenter 600 provides to the customer 622-626, each customer 622-626 may be responsible for customer fee or monthly invoice. That is, the datacenter 600 may charge a customer fee for the provided infrastructure and/or service(s). Generally, the customer fee is expected to be paid at the end of, or after, each billing cycle (e.g., monthly). The billing cycle for each customer 622-626 may be the same. Alternatively, however, one or more customers 622-626 may have different billing cycles.

Regardless of the billing cycle, the customer fee attributed to each customer 622-626 may be based, at least partially, on energy (electricity) consumed by each respective computing device 628-632 or each computing system 604-608 over a given timeframe (e.g., a one-month billing cycle). As such, the customer fee may increase as energy consumption increases and vice versa.

To determine the energy consumption of each computing device 628-632, a plurality of respective drivers 634-638 (i.e., a first driver 634, a second driver 636, and a third driver 638) may be employed. Alternatively, a power distribution unit (PDU) 640 may be employed to determine the energy consumption of each computing device 628-632 or each computing system 604-608.

With regard to the drivers 634-638, each may, for example, be software or a combination of software and hardware. Further, each driver 634-638 is configured to repeatedly obtain energy consumption information from the respective computing device 628-632. Energy consumption information relates to the energy consumed by each computing device 628-632. Accordingly, the energy consumption information that the first driver 634 obtains is associated with energy consumed by the first computing device 628. Likewise, the energy consumption information that the second driver 636 obtains is associated with energy consumed by the second computing device 630, while the energy consumption information the third driver 638 obtains is associated with the energy consumed by the third computing device 632.

In order to obtain the energy consumption information, each driver 634-638 may, for example, query a peripheral component interconnect identification (PCI-ID) of the respective computing device 628-632. This identification may, for example, be a serial number or a universally unique identifier (UUID) assigned by the manufacturer of the respective computing device 628-632. By employing the respective identification, each driver 634-638 may be granted access to the respective computing device 628-632.

As mentioned above, rather than employing drivers 634-638, the PDU 640 may instead be employed to determine the energy consumption of each computing device 628-632 or each computing system 604-608. In such examples, the PDU 640 may include a plurality of ports/plugs 642-646 (i.e., a first port/plug 642, a second port/plug 644, and a third port/plug 646), each associated with a respective computing system 604-608. Each computing system 604-608 couples to the respective port/plug 642-646 so that each computing system 604-608 may receive power/electricity via the PDU 640. In addition to distributing power to each computing system 604-608, the PDU 640 is also employed to determine the energy consumption of each computing system 604-608. It is noted that, in some examples, each computing system 604-608 may simply comprise its respective computing device 628-632. As such, when the PDU 640 determines the energy consumption of each computing system 604-608, the PDU 640 is effectively determining the energy consumption of each computing device 628-632.

The energy consumption information gathered by the respective drivers 634-638 or PDU 640 may take a variety of forms. For example, the respective energy consumption information may include operating voltage and amperage characteristics of the respective computing device 628-632 over given time periods.

In examples where the drivers 634-638 are employed, the first driver 634 may query the first computing device (FCD) 628 to gather FCD energy consumption information over a first time period and again query the FCD 628 to gather updated FCD energy consumption information over a second time period following the first time period, and so on. In a similar manner, the second driver 636 may obtain second computing device (SCD) energy consumption information and updated SCD energy consumption information over a plurality of intervals or time periods. In examples where additional drivers (e.g., the third driver 638) are employed, each may operate in a similar manner.

To obtain the operating voltage and amperage characteristics via the drivers 634-638 from the respective computing device 628-632, each driver 634-638 may, for example, query a voltage sensor 648-652 and/or an amperage sensor 654-658 of the respective computing device 628-628 to gather the operating voltage and amperage information (i.e., energy consumption information) over time. These sensor(s) 648-658 may, for example, be integrated into one or more of a voltage controller, pulse width modulator (PWM) controller, and/or other similar device on the respective computing device 628-632. Further, while the sensors 648-658 are shown integrated into the computing devices 628-632, the sensor(s)s 648-658 may instead be coupled thereto.

In examples where the PDU 640 is instead employed to determine/obtain the energy consumption information associated with each computing system 604-608, the PDU 640 may include sensors (not shown), such as voltage and/or amperage sensors, to determine the energy consumption of each respective computing system 604-608 over respective timeframes. For example, each port/plug 642-646 may be respectively coupled to one or more sensors so that the PDU 640 may determine the energy consumption information associated with each computing system 604-608.

After respective energy consumption information is gathered, the PDU 640 or drivers 634-638 pass the energy consumption information to the ECU 602. The ECU 602 may receive the energy consumption information in a variety of forms. For example, the first driver 634 or PDU 640 may manipulate voltage and amperage information, along with operating times of the FCD 628, to determine a rate of energy consumption (e.g., power in the form of kilowatts). In such an example, the FCD energy consumption information the ECU 602 receives will include power (e.g., kilowatts) and duration of operation information. Alternatively, for example, the first driver 634 or PDU 640 may employ the voltage, amperage, and operating time of the FCD 628 to determine a quantity of energy consumed (e.g., kilowatt-hour) by the FCD 628. As such, the first driver 634 or PDU 640 may instead provide, for example, a quantity of energy consumed in kilowatt-hours to the ECU 602.

Alternatively, in yet another example, instead of determining power or quantities of energy consumed, the first driver 634 or PDU 640 may simply pass the energy consumption information to the ECU 602 in the form of voltage, amperage, and operating times. In such an instance, the ECU 602 may instead manipulate the voltage, amperage, and operating times of the FCD 628 to determine a rate of energy consumption and/or a quantity of energy consumed over a given time period.

Regardless of the form in which the energy consumption information is provided to the ECU 602, the PDU 640 or each driver 634-638 is configured to repeatedly pass along the energy consumption information to the ECU 602. As such, the ECU 602 repeatedly receives updated energy consumption information from the PDU 640 or the respective driver 634-638.

For example, when the drivers 634-638 are employed, the first driver 634 repeatedly passes updated energy consumption information associated with the first computing device 628 to the ECU 602. The second and third drivers 636, 638 operate in a similar manner. Alternatively, when the PDU 640 is instead employed, the PDU 640 repeatedly passes updated energy consumption information associated with each computing device 628-632 to the ECU 602.

Once the energy consumption information is received by the ECU 602, the oracle 616 passes the energy consumption information to the smart contract 618 as an energy consumption input 660.

While the PDU 640 or drivers 634-638 are configured to repeatedly pass along updated energy consumption information to the ECU 602, the oracle 616 is also configured to repeatedly passes along the respective updated energy consumption information to the smart contract 618. In instances where the smart contract is stored on a blockchain, the oracle 616 may pass the respective updated energy consumption information to the blockchain using a smart contract address so that the smart contract 618 may operate on the energy consumption information.

The smart contract 618 may receive the respective energy consumption information inputs 660 at a variety of intervals over the course of each billing cycle. For example, the smart contract 618 may receive updated energy consumption inputs 660 associated with the FCD 628 every second, minute, hour, day, week, and/or etc. It is noted, the smart contract 618 may receive energy consumption inputs 660 associated with each respective computing device 628-632 at different intervals.

Not only does the smart contract 618 receive updated energy consumption information associated with each respective computing device 628-632, each customer 622-626 also receives the respective updated energy consumption information at roughly the same interval the smart contract 618 receives the information. The intervals at which the smart contract 618 and/or the respective customer 622-626 receives updated energy consumption information may, for example, be determined by the respective customer 622-626. For example, the first customer 622 may want updated FSD energy consumption information every second, while the second customer 624 may want updated SCD energy consumption information every hour. In such an instance, the first customer 622 and the smart contract 618 receives updated FCD energy consumption information approximately every second, while the second customer 624 and the smart contract 618 receives updated SCD energy consumption information approximately every hour.

The ECU 602 may, based on the respective updated energy consumption inputs 660, decide to update various aspects of the customer computing system 604-608. While mining for cryptocurrency in the datacenter 600, each computing device (e.g., the customer computing device 628) may consume different amounts of energy over a billing cycle. Further, the rate at which each computing device consumes energy may change over the course of a billing cycle.

The rate and/or quantity of energy consumed by any given computing device 628-632 or system 604-608 may, for example, be dependent on the physical characteristics of the computing device 628-632 and/or on the workload of each computing device 628-632 or system 604-608. With regard to workload, a workload may be in the form of instruction sets. During operation, each instruction set may be compiled down from a human-readable language (e.g., C) into a machine-readable language (e.g., ASM). The number of "steps" taken to compile may be dependent on the instruction set. Since each step generally consumes a quantity of energy (e.g., electricity), the more steps employed, the more energy is consumed and vice versa. Accordingly, the amount of energy consumed by each computing device 628-632 may depend on the workloads carried out by the respective computing device 628-632. Different workloads often consume energy at different rates or different quantities. Since each computing device 628-632 may carry out different workloads over time, each respective computing device 628-632 may consume energy at different rates over the course of a billing cycle. Further, each computing system 628-632 may consume different amounts of energy over the course of a billing cycle.

Since each customer fee (e.g. invoice) may be at least partially based on energy consumption, a customer 622-626 (or the ECU 602) may decide to optimize workloads based on the energy consumption information inputs 660. For example, if the first customer 622 or the ECU 602 determines, based on the energy consumption information inputs 660, that the first customer computing device 628 is consuming more energy than desired, the first customer 622 or ECU 602 may optimize the configuration (e.g., operating frequency) or workload (e.g., which cryptocurrency is being mined) of the first computing device 628 to decrease energy consumption. Additionally or alternatively, the first customer 622 or ECU 602 may, for example, decide to replace the first computing device 628 with a more efficient computing device.

In some example, each customer 622-626 may access the respective energy consumption information inputs 660 more than once during a billing cycle. In such examples, each customer 622-626 need not wait until the end of a billing cycle to determine if respective workload(s) and/or respective computing devices 628-632 (or systems 604-608) should be optimized to minimize costs and/or improve efficiency.

Accordingly, the ECU 602 may allow customers 622-626 to make informed optimization decisions for each respective customer computing device 628-632 or system 604-608. In addition, or alternatively, the ECU 600 may be configured to make automated configuration changes (e.g., operating frequency and which cryptocurrency is mined) to computing devices 628-632 or systems 604-608 based on the energy consumption input(s) 660.

In addition to receiving updated energy consumption information inputs 660, the smart contract 618 may be configured to receive a reward (e.g., a reward input 662) from the distributed network 610. The reward may be associated with work done by one or more of the customer computing devices 628-632. For example, if the first computing device 628 creates a verified block in a blockchain or contributes to the creation of a verified block (e.g., as part of a pool), a reward may be associated to the customer computing device 628. This reward, or at least a representation thereof, may then be provided or addressed to the smart contract 618 as the reward input 662. Based on predefined and self-executing terms of the smart contract 618, the smart contract 618 automatically divides or proportions the reward between the customer 618 and the datacenter 600. That is, the smart contract 618 may proportion a first portion of the reward to the first customer 622 and/or a second portion of the reward to the datacenter 600. In addition, the smart contract 618 may sum any rewards that are received over a billing cycle. For example, the smart contract 618 may automatically sum rewards proportioned to the first customer 622 over the course of a billing cycle.

In a similar manner to that which is discussed above, the smart contract 618 may divide or proportion rewards between other respective customers (e.g., the second, third, and fourth customers 622-626) and the datacenter 600.

After rewards are proportioned, the smart contract 618 may be configured to automatically determine if any reward payout should be made the respective customers 622-626. Take for example, a situation where the smart contract 618 proportions one or more rewards 662 that are associated with work done by the first computing device 628. In such an instance, the smart contract 618 may automatically divide or proportion a first portion of the reward(s) to the first customer 622 and a second portion of the reward(s) to the datacenter 600. If the smart contract 618 determines that the second portion of reward(s) (i.e., the datacenter reward(s)) is less than a minimum threshold or less than the customer's invoice, the smart contract 618 may withhold the first portion of reward(s) from the first customer 622. The smart contract 618 may also offset the amount of the customer's invoice from the reward. If the invoice is greater, the smart contract 618 may continue to withhold the first portion of reward(s) until the received rewards exceed the invoice, or the first customer pays a fee (e.g., pays off an invoice) to the smart contract 618. Once the fee or invoice is paid (e.g., addressed and sent) to the smart contract 618, the smart contract 618 automatically addresses the reward(s) to the first customer 622. In other words, the smart contract 618 pays out the first portion of the reward(s) to the first customer 622.

The fee or invoice may, for example, be greater than or equal to the minimum threshold. By implementing the minimum threshold, the datacenter 600 can reduce potential losses. The minimum threshold may be a predefined term of the self-executing smart contract 618 and may be different for each customer 622-626.

If, on the other hand, the smart contract 618 determines that the second portion of reward(s) is greater than or equal to the minimum threshold, the smart contract 618 may automatically payout or address the first portion of reward(s) to the first customer 622. Rewards may be paid out in the form they were received (e.g., in a cryptocurrency). Alternatively, the smart contract 618 may automatically convert the rewards to another form (e.g., currency or other cryptocurrency) that may be specified in the smart contract 618.

The smart contract 618 may be configured to automatically operate in a similar manner with reward(s) proportioned to the other customers 624-626.

In examples where the ECU 602 and/or the smart contract 618 is communicating with the invoicing system 620, the invoicing system 620 may automatically gather respective customer billing information from the smart contract 618 (which may be stored on a blockchain). The invoicing system may then automatically provide the billing information to the respective customer 622-626. For example, the invoicing system 620 may gather energy consumption rates, hours of operation, customer fee(s), reward information, and/or other relevant billing information that is associated with the first customer 622 from the smart contract 618 or blockchain at the end of each billing cycle. The invoicing system 620 may then automatically provide the information to the first customer 622 (e.g., in the form of an invoice sent via email). The first customer 622 may then, based on the billing information received from the invoicing system 620, provide payment to the smart contract 618. Due to the automatic nature in which the invoicing system 620 and the self-executing smart contract 618 operate, datacenter accounting cost and delays may be reduced.

The invoicing system 620 may operate in a similar manner with respect to the second and third customers 624, 626. That is, the invoicing system may automatically gather and send respective billing information to the respective customer 624, 626.

FIG. 6 generally illustrates an example of computing devices 628-632 and/or systems 604-608 interacting with the ECU 602 of the datacenter 600. As illustrated, each computing system 604-608 and device 628-632 is associated with a respective customer 622-626. The datacenter 602, however, may house additional computing systems and devices respectively associated with additional customers.

Further, while FIG. 6 illustrates that each customer 622-626 is only associated with one computing device 628-632 or system 604-608, respectively, a customer may be associated with more than one computing device. In such instances, the ECU 602 of the datacenter 602 may be configured to employ techniques and processes described herein to determine/obtain updated energy consumption information, costs, rewards, and/or etc. associated with each computing device associated with a given customer. The datacenter 600 may then provide this information to the customer in a single invoice if desired, thus facilitating informed decisions by the customer.

Figure 7:
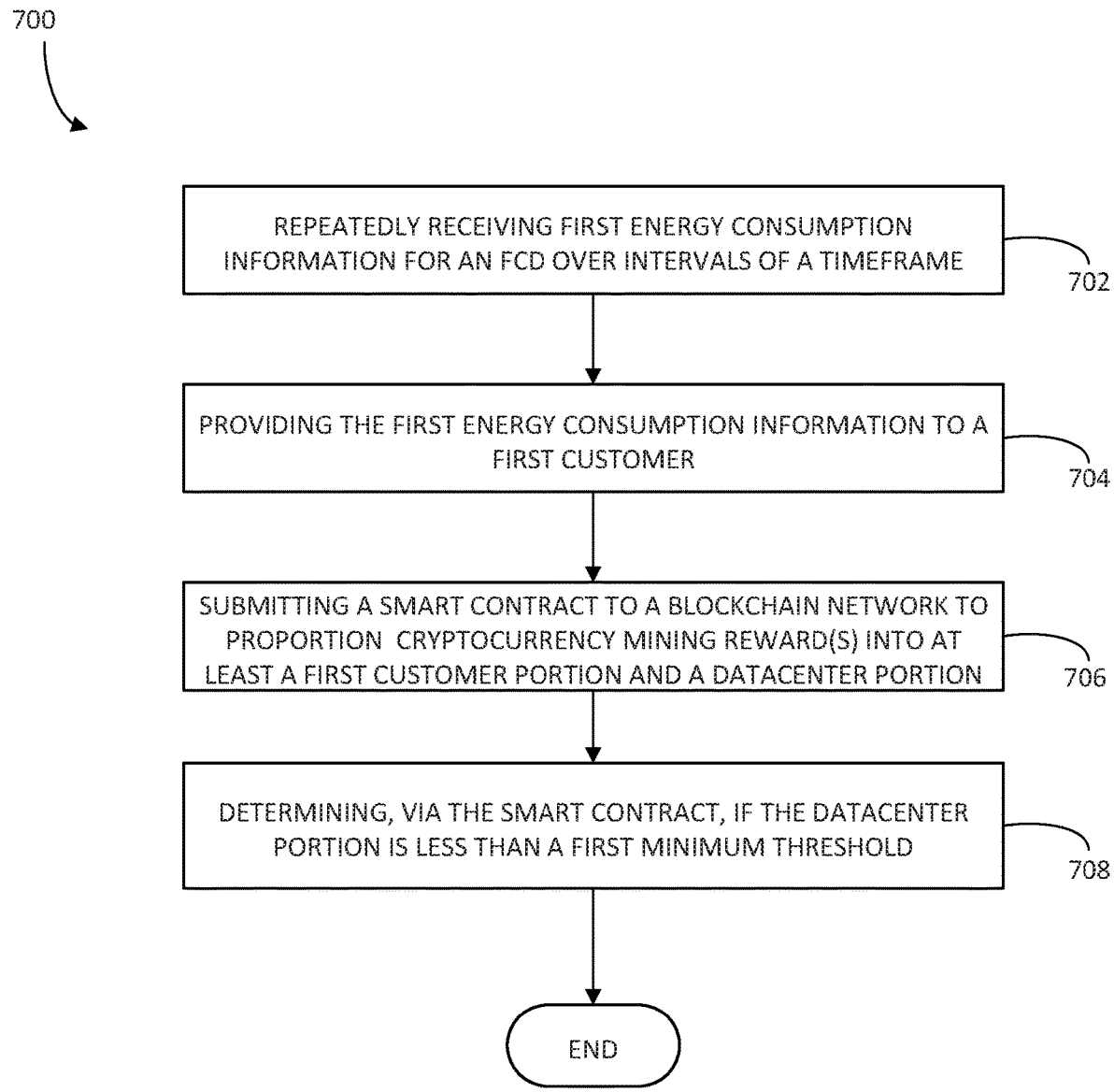
FIG. 7 is a flowchart setting forth an exemplary technique for operating a computer system.

With reference now to FIG. 7, an exemplary method or technique 700 for operating a computing system (e.g., ECU 602 of FIG. 6) is set forth in a flowchart. For illustrative purposes, operations discussed below can be considered to be in the context of a computing device mining cryptocurrency, where the computing device operates in a datacenter (e.g., the datacenter 600 of FIG. 6). Other exemplary techniques, however, may include a computing system or device carrying out other operations besides, or in addition to, mining cryptocurrency.

With continued reference to the technique 700 of FIG. 7, process control begins at section 702 where repeatedly receiving, at an ECU, first energy consumption information via a first computing device (FCD) over intervals of a first timeframe occurs. The first energy consumption information is associated with energy consumed by the FCD over intervals of the first timeframe (e.g., a one-month billing cycle). Further, the energy consumption information may, for example, be received from a driver or PDU associated with the first computing device.

The first energy consumption information may be in the form of kilowatt per hour information, kilowatt-hour information, and/or in other forms of energy consumption information. The FCD may, for example, be a central processing unit (CPU), an application specific integrated circuit (ASIC), a graphics processing unit (GPU), or a field programmable gate array (FPGA). To serve as an example, consider the FCD being a GPU and the first energy consumption information being in the form of kilowatt-hour information. In such an example, the ECU receives kilowatt-hour information over the time intervals. This kilowatt-hour information relates to the energy consumed by the GPU over the respective intervals. The energy (e.g., kilowatt-hour(s)) consumed during each interval may vary.

After or during the reception of the first energy consumption information, process control proceeds to section 704, where providing, via the ECU, the first energy consumption information to a first customer is carried out. The first customer is associated with the FCD. For example, the first customer may own, lease, or rent the FCD.

The first energy consumption information provided may, for example, include at least one of the following: i) a first quantity of kilowatt-hours consumed by the FCD over a first time interval, ii) a second quantity of kilowatt-hours consumed by the FCD over a second time interval, and iii) a third quantity of kilowatt-hours consumed by the FCD over a third time interval. The timeframe over which these intervals occur may be a billing cycle (e.g., one month).

Regardless of the type of first energy consumption information that is provided, the intervals associated with the information may, at least approximately, be set to every second, minute, hour, day, week, and/or other time-interval. Further, the intervals may be selected by the first customer and/or datacenter.

Since the first energy consumption information is associated with energy consumed by the FCD over the intervals, the first customer and/or ECU may employ this information to inform optimization decisions. For example, the first customer or ECU may determine that the FCD should be replaced with a more efficient FCD based on the first energy consumption information. Alternatively, since customer fees charged by the datacenter to the first customer may be based at least in part on energy consumed by the FCD, the first customer or ECU may simply decide to take the FCD offline for at least a portion of a billing cycle (timeframe) to minimize energy consumed by the FCD. For example, the first customer may set a monthly energy consumption limit. When, based on the first energy consumption information, the first customer or ECU determines the monthly energy consumption limit has been met, the first customer or ECU may decide to take the FCD offline for the remainder of the month.

The first energy consumption information may be stored on a blockchain (e.g., the blockchain 100 of FIG. 1 and/or the blockchain 330 of FIG. 3). Further, the information may be stored on a blockchain that also stores a smart contract. Since the first energy consumption information may be stored on a blockchain, the information may be accessible by peers on the blockchain network. Alternatively, however, all or portions of the first energy consumption information may be stored on a blockchain using cryptographic keys (e.g., asymmetric cryptography). That is, some or all of the information may be encrypted with public cryptographic keys respectively associated with customers and the datacenter. In such an example, the information should only be readable by those who have access to the respective customers' private cryptographic key and/or the datacenter's private cryptographic key.

With reference back to FIG. 7, after section 704, process control proceeds to section 706, where submitting a smart contract to a blockchain network to proportion at least one cryptocurrency mining reward into at least a first customer portion and a first datacenter portion occurs. The at least one cryptocurrency reward is associated with work done by at least the FCD. While technique 700 illustrates section 706 occurring after sections 702 and 704, section 706 may instead occur before or during section 704 and section 702 in other exemplary techniques.

The at least one cryptocurrency reward may be addressed to the smart contract. As such, when the smart contract receives the reward, the smart contract may automatically carry out (self-execute) a smart contract term for proportioning the at least one cryptocurrency reward. When the smart contract is stored on a blockchain, these proportioned award(s) may be automatically stored on the blockchain.

Referring back to technique 700, after submitting the smart contract to the blockchain, process control proceeds to section 708, where determining, via the smart contract, if the first datacenter portion is less than a first minimum threshold is carried out. The minimum threshold may be a predetermined term in the smart contract. Further, the minimum threshold may be determined by the datacenter. For example, the datacenter may charge a unit price for each kilowatt-hour consumed by a computing device (e.g., the FCD). At the end of each billing cycle, the datacenter may determine how much energy was consumed by the FCD to determine a fee based on the energy consumed and the unit price (e.g., energy consumed times unit price). This fee may be considered the minimum threshold. If the first datacenter portion is less than the minimum threshold, the smart contract may cause the withholding of all or a portion of the first customer portion from the first customer.

While the minimum threshold discussed above was based on the energy consumed by the FCD, the datacenter may base the minimum threshold on additional or even different information.

After self-executing a smart contract to determine if the reward is less than the first minimum threshold, process control may proceed to an END.

Alternatively, process control may cause the generating of an invoice based on the first energy consumption information. Like the minimum threshold, the invoice may be based on the energy consumed by the FCD over the billing cycle. The invoice may also include additional fees associated with, for example, services provided by the datacenter to the first customer.

After generation of the invoice, process control may allow providing the invoice to the first customer. An automatic invoicing system (e.g., the invoicing system of 620 of FIG. 6) may carry out the invoice generation and automatically provide the invoice to the customer via, for example, an email. In examples where process control provides the invoice to the first customer, process control is effectively providing energy consumption information to the first customer as set forth in section 704. As such, process control need not carry out section 704 before sections 706 and 708.

If, as discussed above, the smart contract is withholding the first customer portion of the reward(s) from the first customer because the minimum threshold has not been met, the smart contract may convey the first customer portion to the first customer after the first customer pays at least a portion (e.g., customer fee for energy consumed) of the invoice to the smart contract. Since the smart contract may automatically withhold or offset reward payouts until an invoice (or portion thereof) is paid, the datacenter may avoid potential losses that are associated with customers that do not pay their invoices.

Further, since the smart contract is self-executing and the invoicing system may function automatically, datacenter accounting costs may be minimized.

Technique 700, along with other techniques/processes discussed herein, may be carried out with a plurality of customer computers. By employing processes/techniques described herein, a datacenter (e.g., the datacenter 600 of FIG. 6) and/or ECU (e.g., ECU 602, FIG. 6) may provide an improved computing environment and/or computing system to serve multi-customer environments in a manner that has not previously been available.

Figure 8B:
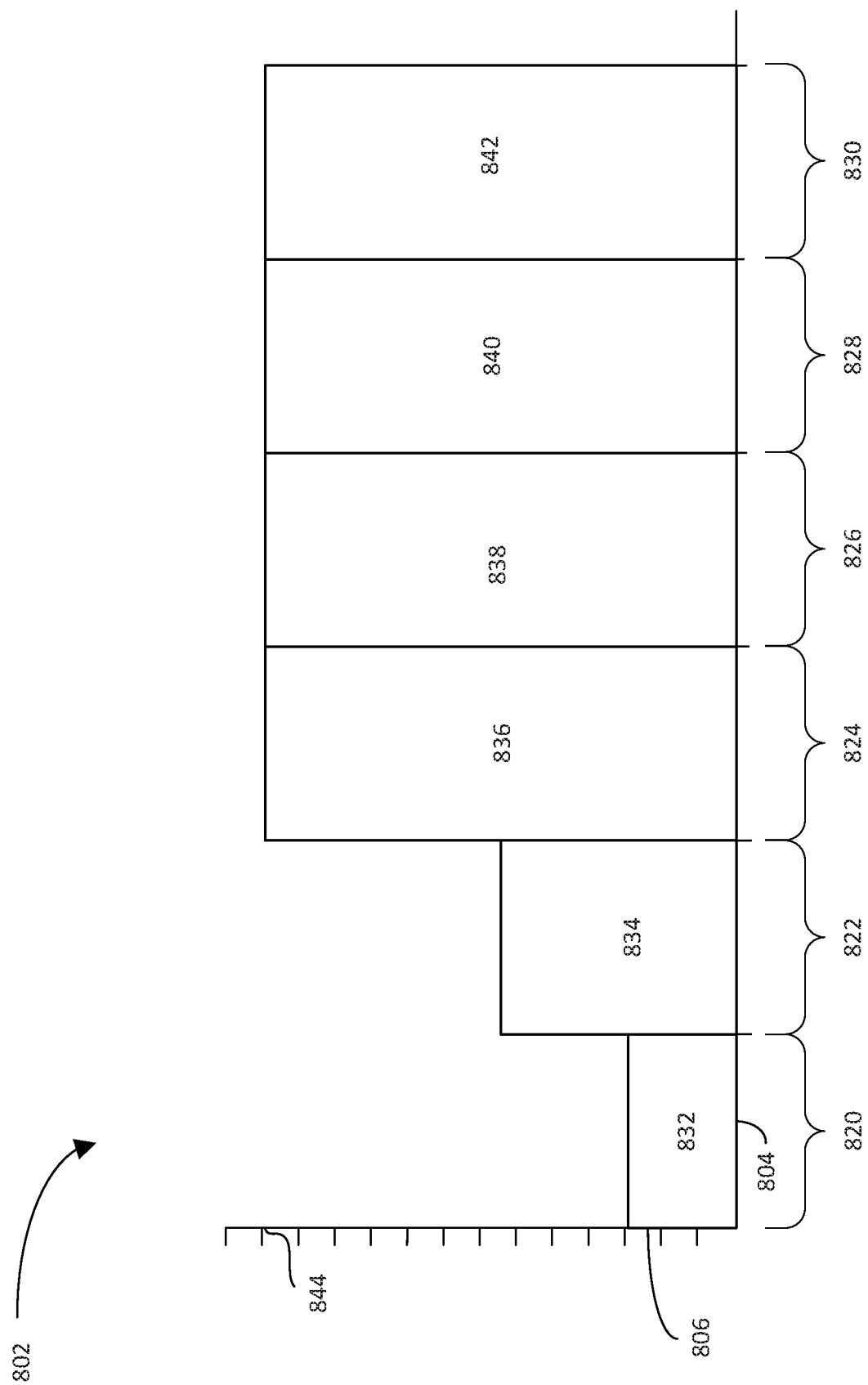
FIG. 8B illustrates another exemplary graphical representation of energy consumption information.

As discussed above, energy consumption information may take a variety of forms and may be provided to a customer over variety of intervals. Further, energy consumption information may be provided to one or more respective customers. The manner in which the energy consumption information is provided to a respective customer may take a variety of forms. FIGS. 8A and 8B represent exemplary graphical representations that may be presented to a respective customer.

FIG. 8A represents a first exemplary graph 800 and FIG. 8B represents a second exemplary graph 802. Each graph 800, 802 includes an x-axis 804 and a y-axis 806. The x-axis 804 is incremented in time intervals (e.g., hours) and the y-axis 806 is incremented in units of energy (e.g., kilowatt-hours).

With reference to FIG. 8A, a plurality of energy consumption bars 808-818 are shown. Each energy bar 808-818 represents how much energy was consumed over a respective interval 820-830. That is, the first energy consumption bar 808 represents energy consumed by a customer computing device or system over a first interval 820, a second energy consumption bar 810 represents energy consumed by the customer computing device over a second interval 822, and so on. Through the visual representation of the exemplary graph 800, a customer can determine how much energy was consumed during each time interval 820-830 by the height of the respective energy consumption bar 808-818.

Further, if the customer can, for example, correlate computing device workload(s) with the time intervals 820-830, the customer may determine how much energy the computing device consumed during various aspects of the workload(s). As such, the customer may decide to optimize the workload(s), or aspects thereof, to minimize energy consumption.

FIG. 8B, while similar to FIG. 8A, presents energy consumption information in a different manner. Like FIG. 8A, FIG. 8B also presents a plurality of energy consumption bars 832-842. However, instead of representing how much energy was consumed during each interval 820-830, each energy consumption bar 832-842 represents how much energy was consumed over the present and proceeding intervals. For example, the second energy consumption bar 834 represents how much energy a computing device or system consumed over the first and second interval 820, 822, while the third energy consumption bar 836 represents how much energy was consumed over the first, second, and third intervals 820-824, and so on.

Due to the manner in which the energy consumption information is presented in FIG. 8B, each energy consumption bar 832-842 represents the total amount of energy consumed up through the respective interval. For example, at the end of the third time interval 824, it can be determined that the total amount of energy consumed by the computing device or system over the first three intervals 820-824 was at a first value 844. Further, it can be determined from the second exemplary graph 802 that no further energy was consumed by the computing device or system after the third interval 824. The customer may have, for example, taken the computing device or system offline at the end of the third interval 824 in order not to consume any further energy.

While the first and second exemplary graphs 800, 802 of FIGS. 8A and 8B, respectively, represent energy consumption information in terms of energy consumed (in, e.g., units of kilowatt-hours) over time (in, e.g., units of hours), other graphical representations may represent energy consumption information in terms of power (e.g., kilowatts) over time. The manner and terms in which the energy consumption information is graphically presented to the customer may be determined by the datacenter and/or selected by the customer.

Still further, the energy consumption information need not be presented to respective customers in graphical form. For example, a plurality of quantities in kilowatt-hours or kilowatt per hour may be provided to respective customers overs a series of intervals in a billing cycle.

Regardless of the manner in which energy consumption information is provided to a customer, such information may be valuable to the customer. For example, the customer may use the information to inform workload optimization decisions and/or computing device and/or system upgrade decisions.

Various examples/embodiments are described herein for various apparatuses, devices, systems, techniques, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "for example," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of terms such as "first," "second," "third," and the like that precede an element(s) do not necessarily indicate sequence unless set forth otherwise, either explicitly or inferred through context.

The invention claimed is:

1. A datacenter comprising:
at least one of a first voltage sensor and a first amperage sensor associated with a first computing device (FCD);
at least one of a second voltage sensor and a second amperage sensor associated with a second computing device (SCD); and
an electronic control unit (ECU) communicating with the FCD and the SCD, the ECU configured to:
receive FCD energy consumption information and additional updated FCD energy consumption information via at least one of the first voltage sensor and the first amperage sensor, wherein the FCD energy consumption information and the updated FCD energy consumption information is associated with energy consumed by the FCD during a first customer billing cycle;
divide a first blockchain mining reward into at least a first customer portion and a first datacenter portion; and
withhold the first customer portion from a first customer when the first datacenter portion is less than a first minimum threshold, wherein the FCD is a first graphical processing unit (GPU) and the SCD is a second GPU, and wherein the first minimum threshold is based in part on at least one of the FCD energy consumption information and the additional updated FCD energy consumption information.

2. The datacenter of claim 1, wherein the FCD is associated with the first customer,
wherein the SCD is associated with a second customer,
wherein the first minimum threshold is a first customer fee owed to the datacenter, and
wherein the ECU is further configured to:
receive SCD energy consumption information and additional updated SCD energy consumption information from at least one of the second voltage sensor and the second amperage sensor, wherein the SCD energy consumption information and the additional updated SCD energy consumption information is associated with energy consumed by the SCD during a second customer billing cycle;
divide a second blockchain mining reward into at least a second customer portion and a second datacenter portion; and
withhold the second customer portion from the second customer when the second datacenter portion is less than a second minimum threshold.

3. The datacenter of claim 2 wherein the ECU is further configured to:
provide the FCD energy consumption information and the additional updated FCD energy consumption information to the first customer during the first customer billing cycle; and
provide the SCD energy consumption information and the additional updated SCD energy consumption information to the second customer during the second customer billing cycle, wherein the ECU employs a self-executing smart contract to (i) receive the FCD energy consumption information and the additional updated FCD energy consumption information and (ii) withhold the first customer portion.

4. The datacenter of claim 3, the self-executing smart contract further configured to pass along the first customer portion to the first customer when the first datacenter portion is greater than the first minimum threshold.

5. The datacenter of claim 4 wherein the FCD energy consumption information includes a first quantity of energy consumed by the FCD during a first time period and the additional updated FCD energy consumption information includes at least a second quantity of energy consumed by the FCD during a second time period and a third quantity of energy consumed by the FCD during a third time period, and wherein at least the first and second time periods are within the billing cycle.

6. The datacenter of claim 4 wherein the FCD energy consumption information includes a first rate of energy consumption by the FCD during a first time period and the additional updated FCD energy consumption information includes at least a second rate of energy consumption by the FCD during a second time period and a third rate of energy consumption by the FCD during a third time period, and wherein at least the first and second time periods are within the billing cycle.

7. The datacenter of claim 4, the processing unit further configured to:
provide a first set of billing information to the first customer and a second set of billing information to the second customer, wherein the first set of billing information includes at least one of the first customer fee, a total monthly operational time of the FCD, and a quantity of energy consumed by the FCD during the billing cycle; and
provide the billing information to a blockchain.

8. A datacenter comprising:
a plurality of computing devices configured for cryptocurrency mining, the plurality of computing devices including a first computing device (FCD) associated with a first customer; and
an electronic control unit (ECU) configured to:
repeatedly receive FCD energy consumption information for the FCD over a first timeframe, wherein the FCD energy consumption information is associated with at least energy consumed by the FCD during a first interval of the first timeframe and energy consumed by the FCD during a second interval of the first timeframe;
provide, via an oracle, the FCD energy consumption information to a self-executing smart contract;
proportion at least one cryptocurrency mining reward into at least a first customer portion and a first datacenter portion, wherein the at least one cryptocurrency reward is associated with work done by at least the FCD; and
determine if the first datacenter portion is less than a first minimum threshold.

9. The datacenter of claim 8, the plurality of computing systems further comprising a second computing device (SCD), wherein the ECU is further configured to:
repeatedly receive SCD energy consumption information for the SCD over the first
timeframe, wherein the SCD energy consumption information is associated with at least energy consumed by the SCD during the first timeframe;
repeatedly provide the SCD energy consumption information to a second customer respectively over a plurality of intervals of the first timeframe, wherein the second customer is one of the first customer and a different customer; and
determine if a second customer portion of the datacenter mining reward is less than a second minimum threshold, the second minimum threshold may be one of the first minimum threshold and a different minimum threshold.

10. The datacenter of claim 9 wherein the ECU interacts with the self-executing smart contract such that the self-executing smart contract causes the ECU to automatically: i) carry out the proportionment of the at least one cryptocurrency mining reward into at least the first customer portion and the first datacenter portion and ii) withhold the first datacenter portion from the first customer when the first datacenter portion is less than the first minimum threshold.

11. The datacenter of claim 10 wherein the FCD energy consumption information is one of a plurality of kilowatt per hour information and a plurality of kilowatt-hour information, and wherein the FCD is one of a central processing unit (CPU), an application specific integrated circuit (ASIC), a graphics processing unit (GPU), and a field programmable gate array (FPGA).

12. The datacenter of claim 11 wherein the plurality of kilowatt-hour information includes a first quantity of kilowatt-hours consumed by the FCD over the first interval and a second quantity of kilowatt-hours consumed by the FCD over the second interval.

13. The datacenter of claim 10 further comprising an invoicing system configured to interact with the ECU to automatically provide an invoice to the first customer, wherein the self-executing smart contract automatically provides the first customer portion to the first customer when at least a portion of the invoice is paid to the self-executing smart contract.

14. A method of operating a computing system comprising:
repeatedly receiving, at an electronic control unit (ECU), first energy consumption information for a first computing device (FCD) over intervals of a first timeframe, wherein the first energy consumption information is associated with energy consumed by the FCD over the intervals of the first timeframe;
providing, via the ECU, the first energy consumption information to a first customer, wherein the first customer is associated with the FCD; and
submitting a first smart contract to a blockchain network, wherein the first smart contract is configured to:
receive, via an oracle, the first energy consumption information;
receive at least one cryptocurrency mining reward;
proportion the at least one cryptocurrency mining reward into at least a first customer portion and a first datacenter portion, wherein the at least one cryptocurrency reward is associated with work done by at least the FCD; and
determine if the first datacenter portion is less than a first minimum threshold.

15. The method of claim 14 further comprising:
repeatedly receiving, at the ECU, second energy consumption information via a second
computing device (SCD) over a second timeframe, wherein the second energy consumption information is associated with energy consumed by the SCD over the second timeframe, wherein at least one of a first driver and a power distribution unit (PDU) provides the first energy consumption information to the ECU and at least one of a second driver and the PDU provides the second energy consumption information to the ECU;

providing, via the ECU, the second energy consumption information to a second customer, wherein the second customer is associated with the SCD; and submitting a second smart contract to the blockchain network, wherein the second smart contract is configured to:

receive at least one additional cryptocurrency mining reward;

proportion the at least one additional cryptocurrency mining reward into a second customer portion and a second datacenter portion, wherein the at least one additional cryptocurrency reward is associated with work done by at least the SCD; and determine if the second datacenter portion is less than a second minimum threshold.

16. The method of claim 15 wherein the first energy consumption information is in the form of at least one of kilowatt per hour information and kilowatt-hour information, and wherein the FCD is one of a central processing unit (CPU), an application specific integrated circuit (ASIC), a graphics processing unit (GPU), and a field programmable gate array (FPGA).

17. The method of claim 16 further comprising:

generating an invoice based on the first energy consumption information;

providing the invoice to the first customer;

withholding, via the smart contract, the first customer portion from the first customer if the first datacenter portion is less than the minimum threshold; and conveying the first customer portion to the first customer when at least a portion of the invoice is conveyed to the smart contract.

18. The method of claim 17 wherein the first energy consumption information provided to the first customer over consecutive intervals includes at least two of: i) a first quantity of kilowatt-hours consumed by the FCD over a first time interval, ii) a second quantity of kilowatt-hours consumed by the FCD over a second time interval, and iii) a third quantity of kilowatt-hours consumed by the FCD over a third time interval, and wherein the timeframe is approximately one billing cycle.

* * * * *